US008194508B2

(12) United States Patent  
Johnston et al.

(10) Patent No.: US 8,194,508 B2
(45) Date of Patent: Jun. 5, 2012

(54) WAVEFORM BASED BIT DETECTION FOR BIT PATTERNED MEDIA

(75) Inventors: Alan Biggar Johnston, Londonderry (IE); Dieter Klaus Weller, San Jose, CA (US); Mark Anthony Gubbins, Letterkenny (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/613,391

(22) Filed: Nov. 5, 2009

(65) Prior Publication Data

US 2011/0102930 A1 May 5, 2011

(51) Int. Cl.
G11B 11/00 (2006.01)

(52) U.S. Cl. .................................................. 369/13.01
(58) Field of Classification Search ........................ None
See application file for complete search history.

(56) References Cited

U.S. PATENT DOCUMENTS

| | | | |
|---|---|---|---|
| 4,040,022 A | 8/1977 | Takii | |
| 5,255,133 A | 10/1993 | Yamamori et al. | |
| 5,535,252 A | 7/1996 | Kobayashi | |
| 5,649,037 A * | 7/1997 | Ohyama et al. | 385/24 |
| 6,490,115 B1 * | 12/2002 | Suzuki et al. | 360/75 |
| 6,728,894 B2 | 4/2004 | McEwen et al. | |
| 7,227,709 B1 * | 6/2007 | Pipal et al. | 360/46 |
| 2002/0116667 A1 | 8/2002 | McEwen et al. | |
| 2002/0176197 A1 * | 11/2002 | Franck et al. | 360/67 |
| 2003/0112723 A1 * | 6/2003 | Ceshkovsky | 369/44.37 |
| 2005/0237651 A1 * | 10/2005 | Sawaguchi et al. | 360/65 |
| 2005/0243456 A1 * | 11/2005 | Mitchell et al. | 360/46 |
| 2008/0019040 A1 | 1/2008 | Zhu et al. | |
| 2008/0212239 A1 * | 9/2008 | Kawato et al. | 360/319 |
| 2009/0002865 A1 * | 1/2009 | Venkataramani et al. | 360/51 |
| 2009/0002867 A1 * | 1/2009 | Gage et al. | 360/51 |
| 2009/0015958 A1 * | 1/2009 | Nakamura et al. | 360/55 |
| 2010/0061019 A1 * | 3/2010 | Benakli et al. | 360/244.1 |
| 2010/0091400 A1 * | 4/2010 | Hamaguchi | 360/75 |
| 2011/0069413 A1 * | 3/2011 | Maat et al. | 360/234.3 |
| 2011/0080670 A1 * | 4/2011 | Gubbins et al. | 360/75 |

OTHER PUBLICATIONS http://en.wikipedia.org/wiki/Spintronics, Dec. 23, 2008; pp. 1-5.
http://en.wikipedia.org/wiki/Spin_(physics), Dec. 23, 2008, pp. 1-6.
http://en.wikipedia.org/w/index.php?title=Spin_transfer &printable=yes, Nov. 25, 2008, 1 page. http://www.hitachigst.com/hdd/research/storage/pm/index.html; "Density Multiplication and Improved Lithography by Directed Block Copolymer Assembly for Patterned Media"—White Papers, 12 pages.

* cited by examiner

*Primary Examiner* — Joseph Feild
*Assistant Examiner* — Henok Heyi
(74) *Attorney, Agent, or Firm* — HolzerIPLaw, PC

(57) ABSTRACT

The presently disclosed technology teaches a transducer head with a read sensor, a write pole, and one or more waveform sensors attached to the transducer head. Further, a waveform propagates in the direction of a BPM and the waveform sensor is configured to detect the waveform after it is reflected from the BPM. Additionally, a spin-polarized current is influenced by the BPM and a spin angular momentum sensor detects changes in spin angular momentum of the current. Further, a processor relates at least one property of the reflected waveform and/or current with positions of patterned bits on the BPM. The processor may then modify a timing signal and/or transducer head position to ensure that data bits are accurately written to the BPM. The end result is the ability to more quickly and accurately detect the patterned bits and synchronize a position of the transducer head with the patterned bits.

23 Claims, 10 Drawing Sheets bit direction 645

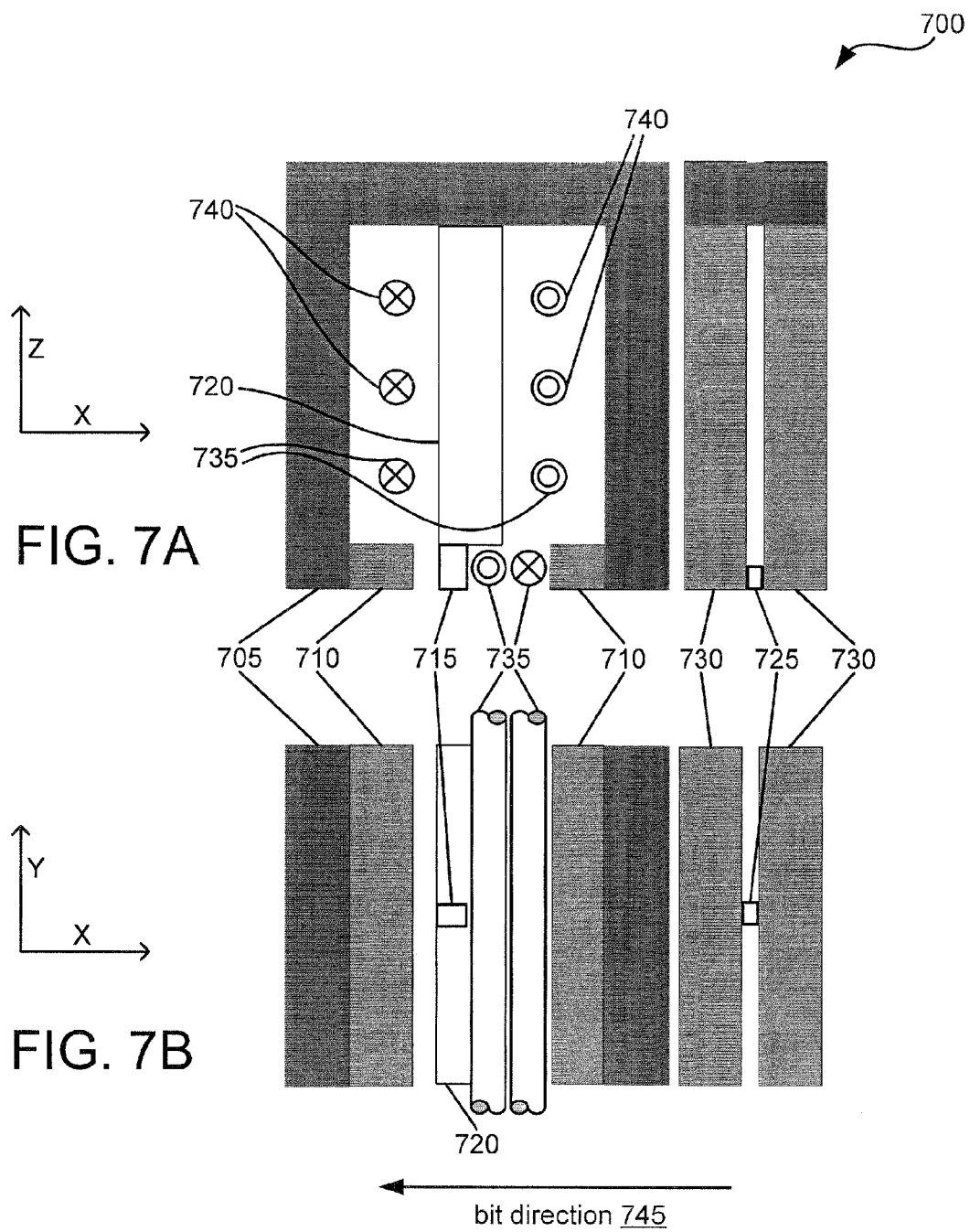

WAVEFORM BASED BIT DETECTION FOR BIT PATTERNED MEDIA

BACKGROUND

Conventionally, during a write to a hard disc by a transducer head, the transducer head uses a magnetic read sensor to read up-track of the writing location to assure the desired data track is targeted during the write operation. As hard disc drive areal or bit density increases, maintaining a consistent track between the read sensor and a writing pole on the transducer head becomes increasingly difficult.

Additionally, in the continuing effort to increase areal density, hard discs with arrays of patterned cells have been designed where each cell can hold a bit of data (bit patterned media (BPM)). With BPM, data may be stored in individual cells along a data track defined by the patterned bits. However, each patterned bit must be temporally synchronized with each data bit. Otherwise, data insertion may occur on an incorrect patterned bit or a patterned bit may be skipped for data writing. Therefore, one of the challenges with BPM is placing the head over the bit of interest accurately during writing. This is especially challenging due to the small size of the patterned bits (e.g. 1 nano-meter wide) and timing control requirements in a disc system rotating at high speeds (e.g. 20-50 pico-seconds per bit or patterned cell).

Conventionally, a transducer head uses a read-before-write process to maintain alignment on a data track; however, that method does not easily apply to BPM. In BPM, the distance along a data track between a write pole and a read sensor may be an order of magnitude greater than the distance between data tracks and/or a distance between bits of interest along the same data track. Further, magnetic readers used in the current state of the art detect a dynamic magnetic signal rather than digital signal (e.g. up-down, on-off, and 0-1).

SUMMARY

An implementation of the presently disclosed technology utilizes an oscillator to generate a waveform (e.g. microwave and infrared) that propagates in the direction of bit-patterned media (BPM) on a disc and a waveform sensor configured to detect the waveform after it is reflected from the disc. A processor relates at least one property of the reflected waveform with positions of patterned bits on the disc. This technique provides the ability to more quickly and accurately detect patterned bits on the disc to allow for improved writing of data to a hard disc drive.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTION OF THE DRAWINGS

The described technology is best understood from the following Detailed Description describing various implementations read in connection with the accompanying drawings.

FIGS. 7A and 7B illustrate sectional elevation and plan views of an implementation of a transducer head with two waveform sensors, each waveform sensor located up-track of the write pole.

DETAILED DESCRIPTION

In non-BPM magnetic storage media, a magnetic recording layer includes a thin film of a magnetic alloy that forms random nanometer-scale grains that behave as independent magnetic elements. Each written bit is made up of many of these random grains. In BPM, the magnetic layer is pre-patterned with an ordered array of patterned bits, each patterned bit capable of storing an individual data bit. The BPM may be pre-patterned through various procedures such as, but not limited to, lithography, ion-milling, etc.

Figure 1:
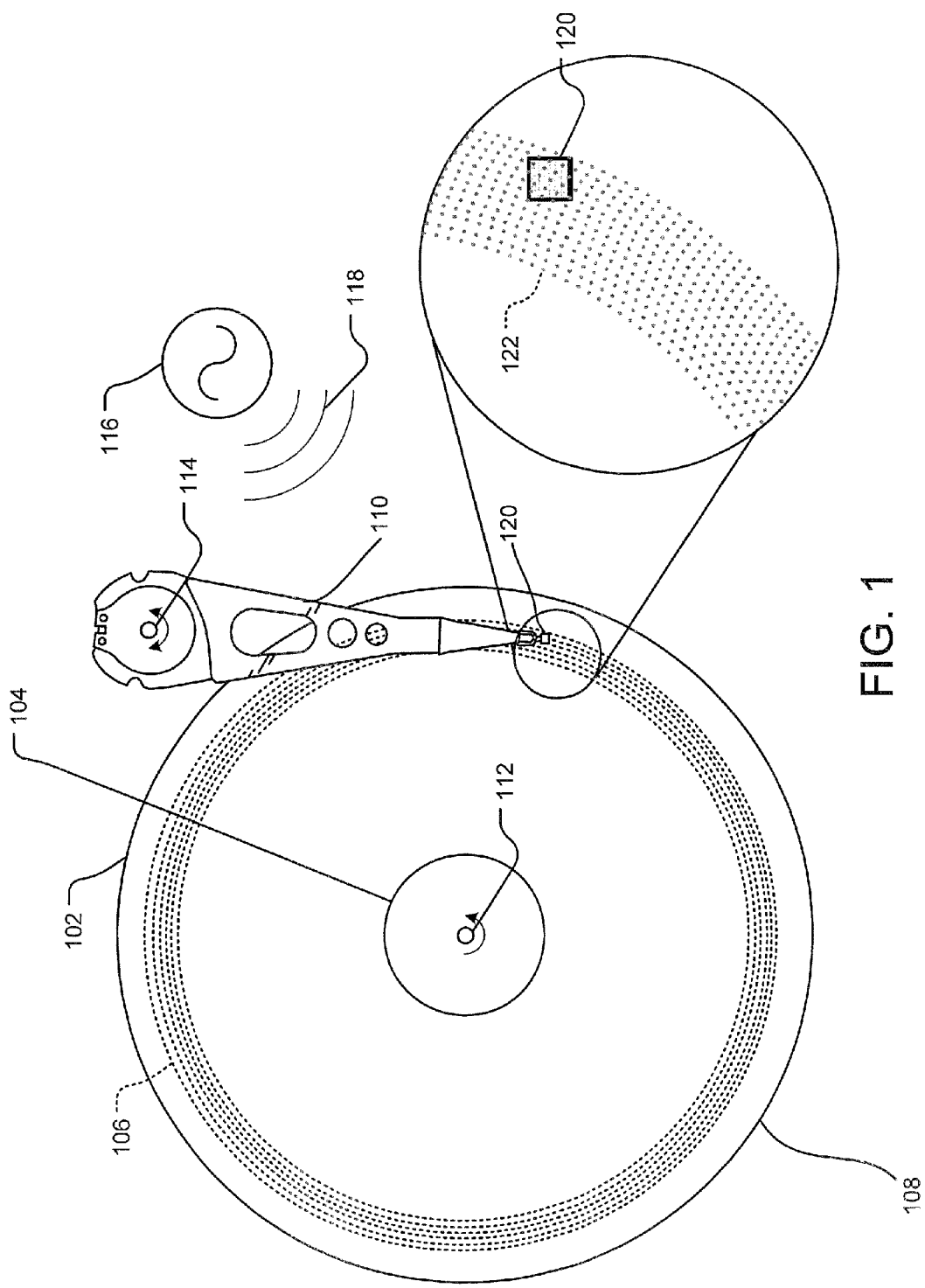
FIG. 1 illustrates a plan view of an implementation of bit patterned media (BPM) on a disc with a transducer head situated on an end of an actuator assembly.

FIG. 1 illustrates a plan view of an implementation of BPM on a disc 108 with a transducer head 120 situated on an end of an actuator assembly 110. Disc 108 rotates about a disc axis of rotation 112 during operation. Further, disc 108 includes an outer diameter 102 and inner diameter 104 between which are a number of data tracks 106, illustrated by circular dotted lines. Data tracks 106 are substantially circular and are made up of regularly spaced patterned bits 122.

Information may be written to and read from the patterned bits 122 on the disc 108 through the use of the actuator assembly 110, which rotates during a data track 106 seek operation about an actuator axis of rotation 114 positioned adjacent the disc 108. A transducer head 120 mounted on the actuator assembly 110 at an end distal the actuator axis of rotation 114 flies in close proximity above the surface of the disc 108 during disc operation.

A signal generator 116 (e.g. an oscillator) that generates a signal 118 (e.g. a waveform) that interacts with the disc 108 may be incorporated into the actuator assembly 110 or elsewhere in the general vicinity of the disc 108. While an oscillator and a waveform are depicted in FIG. 1, other signal generators (e.g. angular momentum injectors) and signals (e.g. spin-polarized current) are contemplated herein.

In an implementation according to the current state of the art, a transducer head utilizes a read sensor to perform a read-before-write process to maintain the transducer head over the desired data track. The read-before-write process is performed by reading magnetic signals from grains on a disc and determining the write pole location from the detected data. However, as discussed above, this read-before-write process is not particularly effective for BPM, especially BPM with high areal density rotating at high speeds.

In an implementation according to the presently disclosed technology, transducer head 120 includes one or more waveform sensors and a write pole, which will be discussed in more detail with respect to FIGS. 2-7. A waveform sensor in lieu of or in addition to the read sensor offers improved accuracy and speed in determining write pole location from detecting the signal 118 when reflected from the patterned bits 122 to the transducer head 120.

In another implementation according to the presently disclosed technology, transducer head 120 includes one or more electrical wires containing spin-polarized currents and a write pole which will be discussed in more detail with respect to FIGS. 2-7. A spin angular momentum sensor in lieu of or in addition to the read sensor offers improved accuracy and speed in determining write pole location by detecting changes in spin properties of the one or more spin-polarized currents when the electrical wires pass in close proximity to the patterned bits 122.

Figure 2:
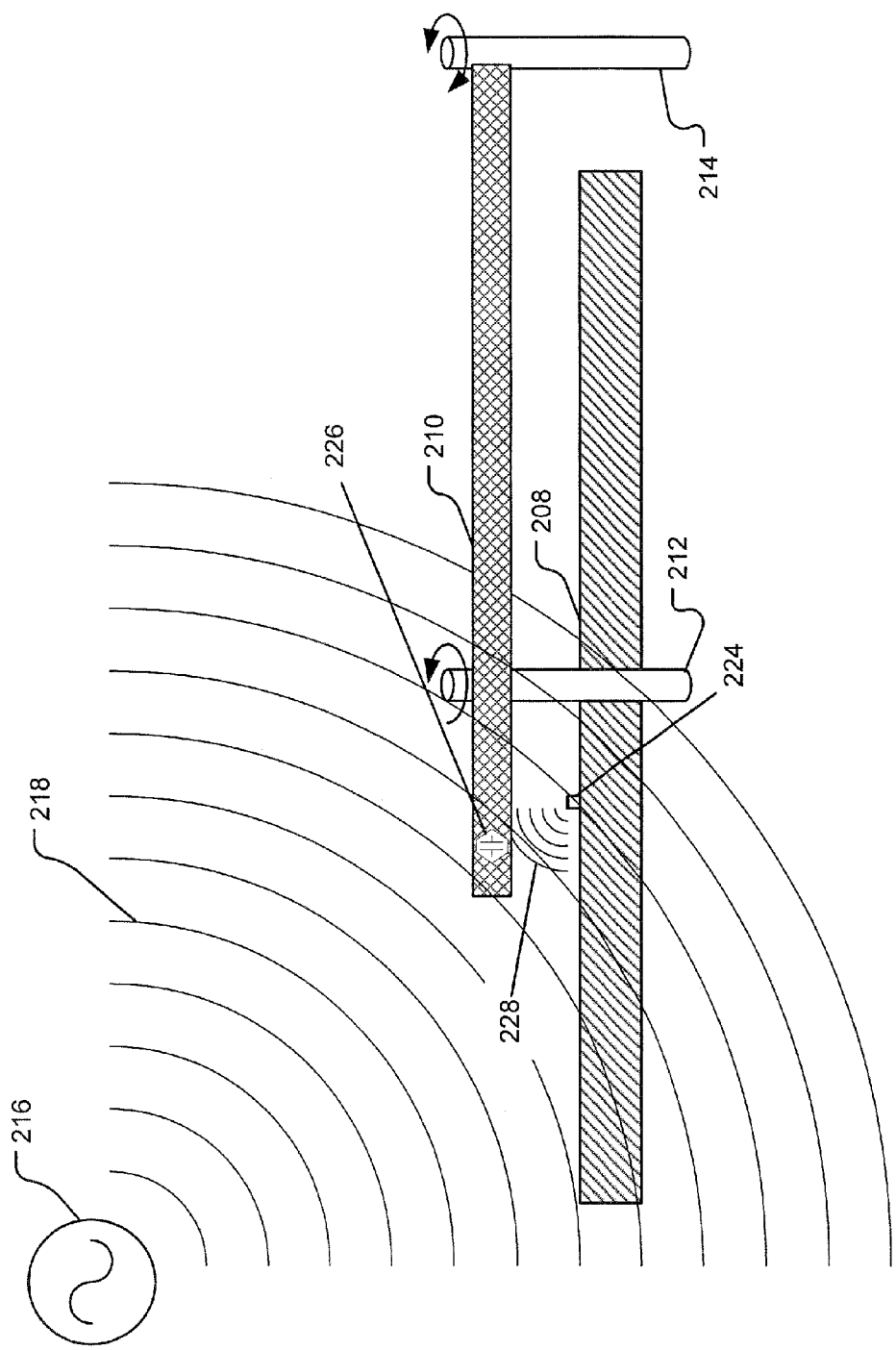
FIG. 2 illustrates an elevation view of a disc with an implementation of a waveform generated by an oscillator reflected off a bit of interest and received by an example detector wire.

FIG. 2 illustrates an elevation view of a disc 208 rotating about a disc axis of rotation 212 with an implementation of a waveform 218 generated by an oscillator 216 reflected off a bit of interest 224 and received by an example waveform sensor 226 located at one end of an actuator assembly 210 (e.g., on a transducer head). The oscillator 216 may be any electronic circuit capable of producing a repetitive electronic signal (e.g. a microwave). Further, the oscillator 216 may be a harmonic oscillator that produces a sinusoidal output, or a relaxation oscillator that produces a non-sinusoidal output, such as a square wave or saw tooth output. Still further, the oscillator 216 may be a bonded microchip with a delivery system in the form of a wire or a slot line.

The oscillator 216 may be located anywhere in the vicinity of the disc 208 so long as the disc 208 is able to receive and reflect the waveform 218 clearly. More specifically, the oscillator 216 may be located directly on the transducer head or elsewhere in a structure containing the disc 208. Generally, the closer the oscillator 216 is to the transducer head, the stronger the waveform 218 reflected by the disc 208 is and associated timing delays and interference caused by physical distance from the transducer head are reduced.

In order to accurately detect bits of BPM passing by the waveform sensor 226, the waveform 218 generated by the oscillator 216 may have a high enough frequency to detect individual patterned bits passing underneath the transducer head (e.g. a microwave or infrared electromagnetic waveform). The waveform 218 propagates in the direction of the disc 208 and is reflected off a surface of the disc 208 to a waveform sensor 226. In the implementation shown in FIG. 2, the waveform sensor 226 is positioned on an end of the actuator assembly 210 that moves about an actuator axis of rotation 214.

In one implementation, the waveform sensor 226 is any device configured to detect the presence of a reflected waveform 228. In another implementation, the waveform sensor 226 is configured to detect wave shape, wave level, amplitude, frequency, wavelength, and/or other properties specific to the reflected waveform 228. The presence of the reflected waveform 228 and/or various properties of the reflected waveform 228 detected by the waveform sensor 226 may be used to determine the location of the bit of interest 224 on the disc 208.

In one implementation, the presence of the reflected waveform 228 detected by the waveform sensor 226 indicates an on-bit position of the waveform sensor 226 and an absence of the reflected waveform 228 indicates an off-bit position of the waveform sensor 226. Further, when the disc 208 is rotating, a series of on-bit and off-bit positions may result in a square or saw tooth reflected waveform 228 with a first level corresponding to an off-bit position and a second level corresponding to an on-bit position. In another implementation, the series of on-bit and off-bit positions may result in a sinusoidal reflected waveform 228 with a peak amplitude corresponding to an on-bit position and an inverse peak amplitude corresponding to an off-bit position.

In yet another implementation, the frequency of the reflected waveform 228 is related to the areal density or bit size and the rotation speed of the disc 208. A smaller bit size and/or faster rotation speed may yield a higher frequency of the reflected waveform 228. Likewise, a larger bit size and/or slower rotation speed may yield a lower frequency of the reflected waveform 228.

In yet another implementation, wave shape, wave level, amplitude, frequency, wavelength, and/or other properties specific to the reflected waveform 228 vary when the waveform 218 reflects from an on-bit position as compared to reflecting from an off-bit position of the waveform sensor 226. The waveform sensor 226 may be configured to detect wave shape, wave level, amplitude, frequency, wavelength, and/or other properties specific to the reflected waveform 228 and thus on-bit and off-bit positions of the waveform sensor 226. Further, when the disc 208 is rotating, a series of on-bit and off-bit positions results in a reflected waveform 228 with an alternating series of first wave shape, wave level, amplitude, frequency, and/or wavelength and second wave shape, wave level, amplitude, frequency, and/or wavelength corresponding to the on-bit and off-bit waveform sensor 226 positions.

In yet another implementation, the wave shape, wave level, amplitude, frequency, and/or wavelength of the reflected waveform 228 varies when the waveform 218 is reflected directly from an on-track position as compared to reflecting from an off-track position of the waveform sensor 226.

In one implementation, a spin-polarized current injector is used in lieu of an oscillator and the waveform sensor is a spin angular momentum sensor. Referring to FIG. 2, the spin-polarized current injector is positioned on an end of the actuator assembly 210 that moves about the actuator axis of rotation 214 (e.g., the location where waveform sensor 226 is shown). The location of the spin-polarized current injector with respect to a transducer head is discussed in more detail with respect to FIGS. 6 and 7. While there is no oscillator 216 in this implementation, the spin angular momentum sensor may be located anywhere current from the spin-polarized current injector may be directed.

Current from the spin-polarized current injector passes through the transducer head via an electrical wire in close proximity to the bit of interest 224. A magnetic field possessed by the bit of interest 224 interacts with (i.e. transfers spin angular momentum to) the spin-polarized current (referred to herein as spin precession). The spin angular momentum sensor then detects changes in spin properties of the spin-polarized current.

Elementary particles, such as photons, electrons, and various quarks possess an intrinsic physical property known as spin. Spin combined with a mass of the elementary particles may be expressed as a spin angular momentum with a magnitude (speed of particle rotation) and a direction (axis of rotation). When expressed along an arbitrary axis (e.g. z-axis), the spin angular momentum may either exist in a +z or a −z direction, which is referred to herein as spin-up species and spin-down species, respectively.

Further, spin transfer is known as the phenomenon where the spin angular momentum of the elementary particles can be transferred from one location to another. More specifically, spin angular momentum of a spin-polarized current (i.e. spin-polarized electrons) can be affected by nearby magnetic fields and vice versa. The exploitation of this phenomenon in electronics is known as spin transport electronics, spintronics, or magnetoelectronics.

In the presently disclosed technology, the spin-polarized current injector may be any device that can generate a current of spin-polarized electrons with more of one spin species than the other spin species (e.g. more spin-up than spin-down and more spin-down that spin-up). In one implementation, the spin-polarized current injector passes non-spin-polarized current through a ferromagnetic material (e.g. a giant magnetoresistance (GMR) device or a tunnel magnetoresistance (TMR) device). More specifically, a typical GMR device has at least two layers of ferromagnetic materials separated by a spacer layer. Alignment of magnetization vectors of the ferromagnetic layers will cause non-spin-polarized current passing parallel to the ferromagnetic layers (current-in-plane (CIP)) or passing perpendicular to the ferromagnetic layers (current-perpendicular-to-plane (CPP)) to spin polarize. Further, a typical TMR device operates by tunneling CPP current through a thin insulator separating ferromagnetic layers.

The spin-polarized current injector and spin angular momentum sensor may be located anywhere in the vicinity of the disc 208 so long as a time for the spin-polarized current to flow from the spin-polarized current injector to the spin angular momentum sensor does not exceed a maximum percentage of a spin lifetime. The spin lifetime is a time for a non-equilibrium polarization to decay to an equilibrium polarization. In cases where a magnetic field is not present, equilibrium polarization is equal numbers of spin species.

More specifically, the spin-polarized current injector and/or spin angular momentum sensor may be located directly on the transducer head 222 or elsewhere in a structure containing the disc 208. Generally, the closer the spin-polarized current injector is to the spin angular momentum sensor, the smaller the polarization decay. Also, when the spin-polarized current injector and/or spin angular momentum sensor are positioned closer to the transducer head 220, associated timing delays and interference caused by physical distance from the transducer head 220 are generally reduced.

In the presently disclosed technology, the spin angular momentum sensor may be any device that is sensitive to spin polarization properties of the current of spin-polarized electrons. In one implementation, the spin angular momentum sensor is a stack of at least two layers of ferromagnetic materials with aligned magnetization vectors separated by a spacer layer. The current of spin-polarized electrons pass parallel to the stack of ferromagnetic materials and affect the magnetization vectors. The change in the magnetization vectors is measured to calculate spin magnitude and/or direction of the spin-polarized current.

Similarly, alignment of magnetization vectors of the ferromagnetic layers will cause non-spin-polarized current passing parallel to the ferromagnetic layers (current-in-plane (CIP)) or non-spin-polarized current passing perpendicular to the ferromagnetic layers (current-perpendicular-to-plane (CPP)) to spin-polarize.

In one implementation, the spin angular momentum sensor is any device configured to detect the presence of spin-polarized current. In another implementation, the spin angular momentum sensor is configured to detect spin magnitude, spin direction, and/or other properties specific to the spin-polarized current. In another implementation, the spin angular momentum sensor is configured to detect a frequency of alternating spin species. The presence of spin-polarized current and/or various properties of the spin-polarized current detected by the spin angular momentum sensor may be used to determine the location of the bit of interest 224 on the disc 208.

In one implementation, the presence of the spin-polarized electrons detected by the spin angular momentum sensor indicates an on-bit position of the electrical wire containing spin-polarized current and an absence of the spin-polarized electrons indicates an off-bit position of the electrical wire or vice versa. Further, when the disc 208 is rotating, a series of on-bit and off-bit positions may result in a square or saw tooth waveform with a first spin magnitude that corresponds to an off-bit position and a second spin magnitude that corresponds to an on-bit position. In another implementation, the series of on-bit and off-bit positions may result in a waveform with a first spin direction corresponding to an off-bit position and a second spin direction corresponding to an on-bit position.

In yet another implementation, the frequency of alternating spin species is related to the areal density or bit size and the rotation speed of the disc 208. A smaller bit size and/or faster rotation speed may yield a higher frequency of alternating spin species. Likewise, a larger bit size and/or slower rotation speed may yield a lower frequency of alternating spin species. In still another implementation, the spin magnitude and/or spin direction of the spin-polarized current varies when the electrical wire is on-track as compared to off-track.

Figure 3:
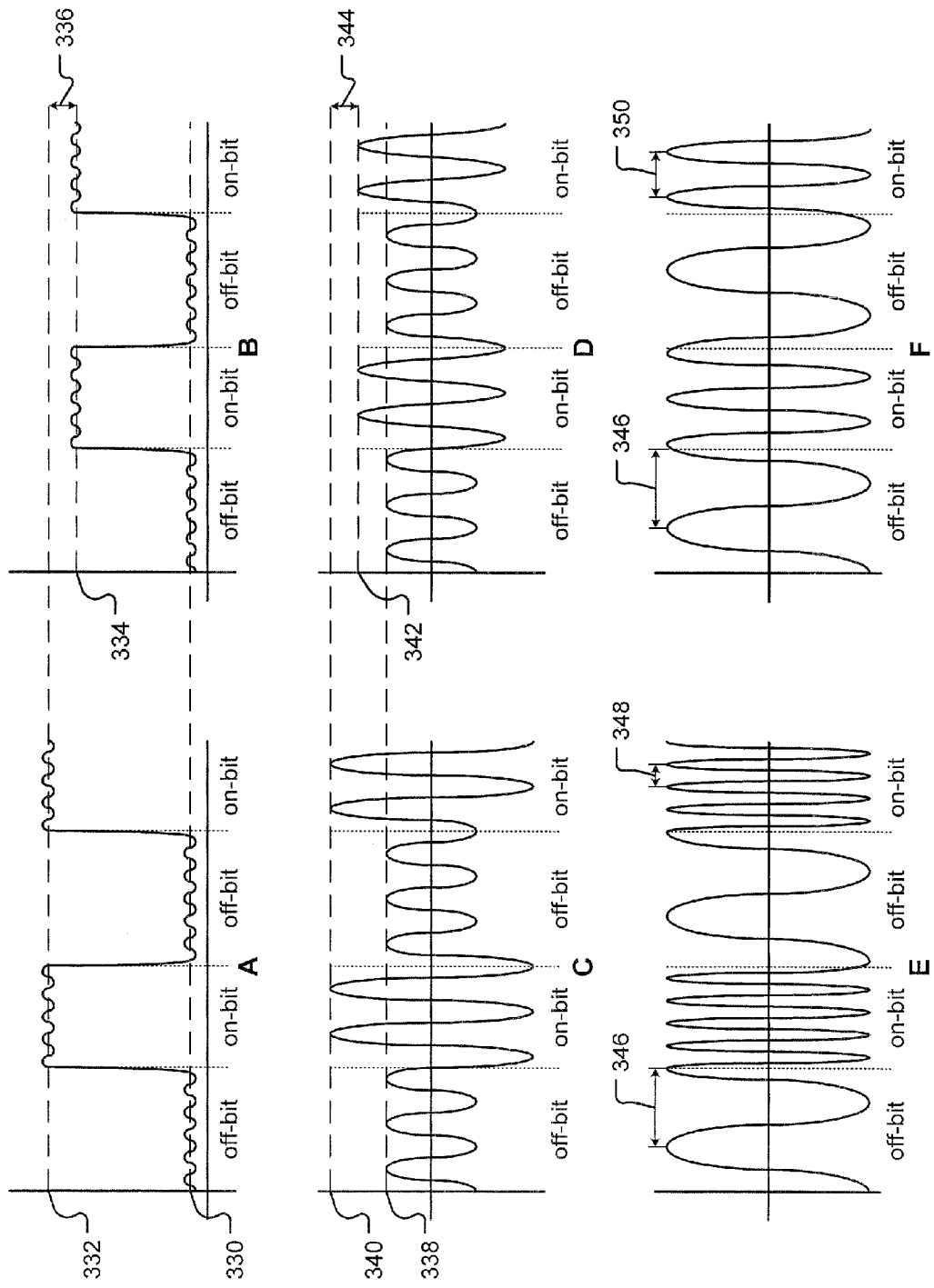
FIG. 3 illustrates six waveforms representing various implementations of a reflected waveform indicating alignment of a write pole with patterned bits on a disc.

FIG. 3 illustrates six waveforms representing various implementations of a reflected waveform indicating alignment of a write pole with BPM on a disc. Waveforms A, C, and E illustrate on-bit and off-bit positions as discussed above. Waveforms B, D, and F further illustrate off-track positions as discussed above.

More specifically, waveform A is a square waveform with a first level 330 corresponding to an off-bit position of a waveform sensor and a second level 332 corresponding to an on-bit position of the waveform sensor. The sequence of first levels 330 and second levels 332 propagates as a square wave as the waveform sensor flies over BPM on a disc.

Further, the second level 332 of waveform A also corresponds to an on-track position of the waveform sensor. Waveform B is a square waveform that corresponds to the waveform sensor flying some distance off-track of a sequence of BPM. A third level 334 of waveform B corresponds to an on-bit but off-track position of the waveform sensor. More specifically, a level difference 336 is represented graphically by the difference between the third level 334 of waveform B and the second level 332 of waveform A and defines how far off-track the waveform sensor is tracking.

Waveform C is a sinusoidal waveform with a first amplitude 338 corresponding to an off-bit position of the waveform sensor and a second amplitude 340 corresponding to an on-bit position of the waveform sensor. The sequence of first amplitudes 338 and second amplitudes 340 propagates as a sinusoidal waveform as the waveform sensor files over BPM on the disc.

Further, the second amplitude 340 of waveform C also corresponds to an on-track amplitude of the waveform sensor. Waveform D is a sinusoidal waveform that corresponds to the waveform sensor flying some distance off-track of a sequence of BPM. A third amplitude 342 of waveform D corresponds to an on-bit but off-track position of the waveform sensor. More specifically, an amplitude difference 344 is represented graphically by the difference between the third amplitude 342 of waveform D and the second amplitude 340 of waveform C and defines how far off-track the waveform sensor is tracking.

Waveform E is a sinusoidal waveform with a first wavelength or frequency 346 corresponding to an off-bit position of the waveform sensor and a second wavelength or frequency 348 corresponding to an on-bit position of the waveform sensor. The sequence of first wavelengths or frequencies 346 and second wavelengths or frequencies 348 propagates as a sinusoidal waveform as the waveform sensor files over BPM on the disc.

Further, the second wavelength or frequency 348 of waveform E also corresponds to an on-track wavelength or frequency of the waveform sensor. Waveform F is a sinusoidal waveform that corresponds to the waveform sensor flying some distance off-track of a sequence of BPM. A third wavelength or frequency 352 of waveform F corresponds to an on-bit but off-track position of the waveform sensor. More specifically, a wavelength or frequency difference is represented graphically by the difference between the third wavelength or frequency 350 of waveform F and the second wavelength or frequency 348 of waveform E and defines how far off-track the waveform sensor is tracking.

Waveforms A-F depicted in FIG. 3 are intended as example waveforms only. There are countless additional waveforms contemplated herein that possess one or more properties that may be associated with on-bit and off-bit positions as well as on-track and off-track positions.

Figure 4:
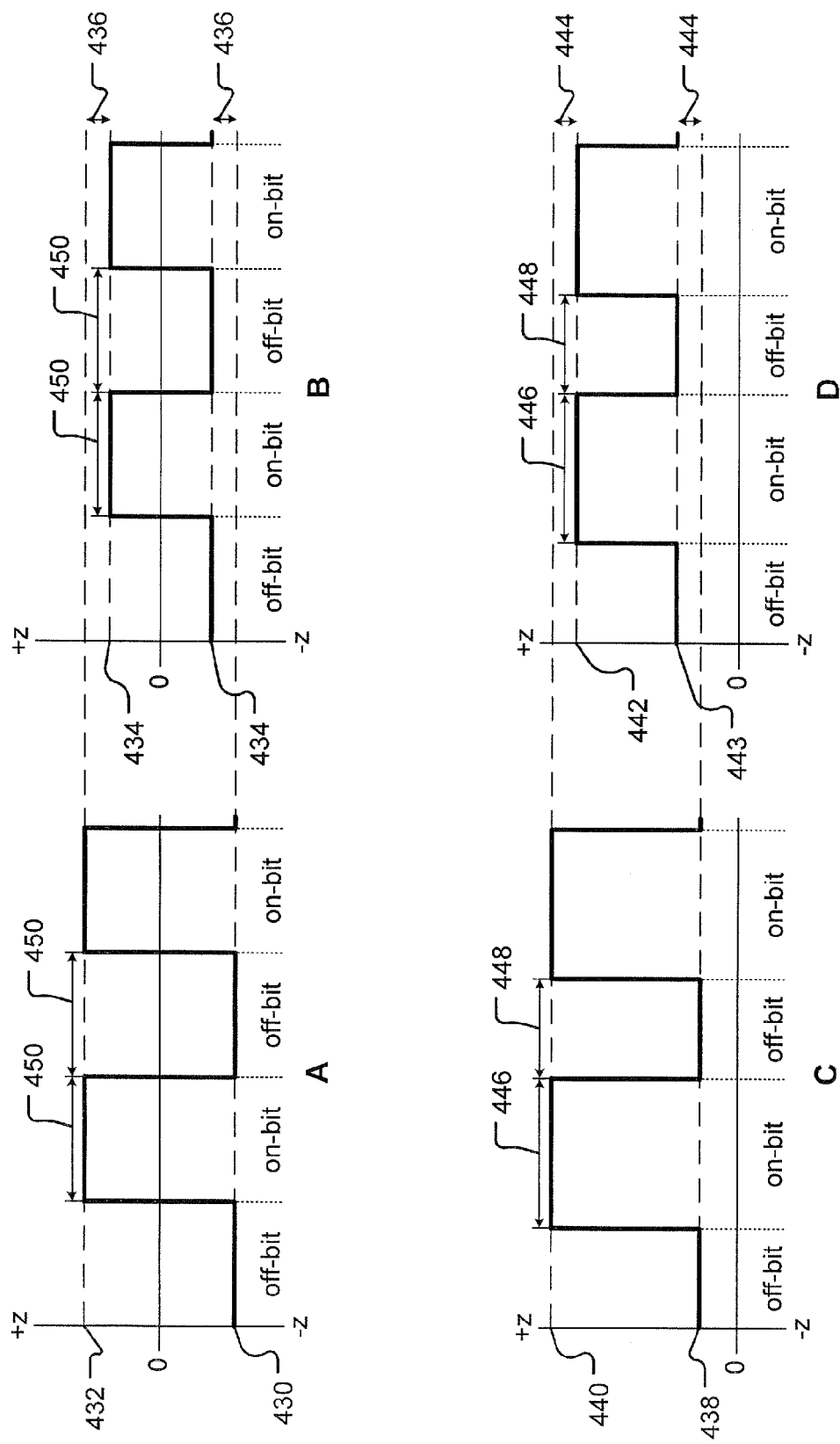
FIG. 4 illustrates four waveforms representing various implementations of spin-polarized current properties indicating alignment of a write pole with patterned bits on a disc.

FIG. 4 illustrates four waveforms representing various spin-polarized current properties indicating alignment of a write pole with patterned bits on a disc. Waveforms A and C illustrate on-bit and off-bit positions as discussed above. Waveforms B and D further illustrate off-track positions as discussed above.

More specifically, waveform A illustrates a first spin direction 430 (−z direction) corresponding to an off-bit position of an electrical wire containing a spin-polarized current and a second spin direction 432 (+z direction) corresponding to an on-bit position of the electrical wire. The sequence of first levels 430 and second levels 432 propagates as a square waveform as the electrical wire flies over BPM on the disc.

Further, the second spin direction 432 of waveform A also corresponds to an on-track position of the electrical wire. Waveform B is a square waveform that corresponds to the electrical wire flying some distance off-track of a sequence of BPM. Magnitudes 434 of waveform B in the +z and −z directions correspond to on-bit but off-track positions of the electrical wire. More specifically, magnitude differences 436 are represented graphically by the difference between magnitudes 434 of waveform B and magnitudes 430 and 432 of waveform A and define how far off-track the electrical wire is tracking.

Waveform C is a square waveform with a first spin magnitude 438 corresponding to an off-bit position of an electrical wire containing a spin-polarized current and a second spin magnitude 440 corresponding to an on-bit position of the electrical wire. The sequence of first magnitudes 438 and second magnitudes 440 propagates as a square waveform as the electrical wire flies over BPM on a disc.

Further, the second spin magnitude 440 of waveform C also corresponds to an on-track amplitude of the electrical wire. Waveform D is a square waveform that corresponds to the electrical wire flying some distance off-track of a sequence of BPM. A third spin magnitude 442 of waveform D corresponds to an on-bit but off-track position of the electrical wire. A fourth spin magnitude 443 of waveform D corresponds to an off-bit and off-track position of the electrical wire. More specifically, magnitude differences 444 are represented graphically by the difference between the third magnitude 442 of waveform D and the second magnitude 440 of waveform C and the difference between the fourth magnitude 443 of waveform D and the first magnitude 438 of waveform C. The magnitude differences 444 define how far off-track the electrical wire is tracking.

On-bit and off-bit periods 450 are equal in waveforms A and B, illustrating that the time that the electrical wire flying over the sequence of BPM is positioned on-bit is substantially equal to the time the electrical wire is positioned off-bit. However, in the implementation of waveforms C and D, on-bit periods 446 are longer than off-bit periods 448 indicating that the time that the electrical wire is positioned on-bit is greater than the time the electrical wire is positioned off-bit. In further implementations, off-bit periods that are longer than on-bit periods indicate that the time that the electrical wire is positioned off-bit is greater than the time the electrical wire is positioned on-bit.

Waveforms A-D depicted in FIG. 4 are intended as example waveforms only. There are countless additional waveforms contemplated herein that possess one or more properties that may be associated with on-bit and off-bit positions as well as on-track and off-track positions.

In some implementations, a processor is adapted to relate the presence of a detected waveform (e.g. a reflected waveform or a spin-polarized current) or alternatively, varied amplitudes, frequencies, and/or wavelengths of the detected waveform to positions of BPM on a disc with respect to a write pole on a transducer head. The processor may be configured to convert one or more properties of the detected waveform (e.g. wave shape, wave level, amplitude, frequency, and wavelength) to a periodic digital signal (e.g. up-down, on-off, and 0-1). In one implementation, the periodic digital signal takes the form of a voltage and/or current spike in an electrical wire serving as the waveform sensor or a spin-polarized current conduit. In other implementations, the processor is adapted to relate the presence of spin-polarized current or alternatively, varied spin directions, magnitudes, and/or time periods to positions of BPM on a disc with respect to a write pole on a transducer head.

The processor may be located anywhere in the vicinity of the transducer head limited only be the ability to send and receive digital signals to/from the write pole. More specifically, the processor may be located directly on the transducer head or elsewhere in a structure containing the disc. However, timing delays and/or electronic interference caused by sending electronic signals over physical wires to/from the transducer head is reduced when the processor is positioned closer to the transducer head.

The processor may be configured to detect individual patterned bit positions or alternatively, detect average patterned bit positions by analyzing a periodic property (e.g. wave shape, wave level, amplitude, frequency, and wavelength) of the detected waveform.

In further implementations, the processor modifies a timing signal configured to time write operations from the write pole to the BPM on the disc to synchronize with the detected waveform (e.g. a reflected waveform or a spin-polarized current) in order to ensure that data bits are accurately written to the BPM on the disc. The timing signal may be a waveform that is synchronized in phase or a certain amount out-of-phase with the detected waveform. More specifically, a phase-locked loop (PLL) or delay-locked loop may be used to generate a timing signal that is phase and frequency synchronized with the detected waveform. In yet another implementation, the processor modifies the write pole track based on a property of the detected waveform indicating an off-track position of the electrical wire. In further implementations, the processor may utilize detected waveforms from more than one electrical wire.

Figure 5:
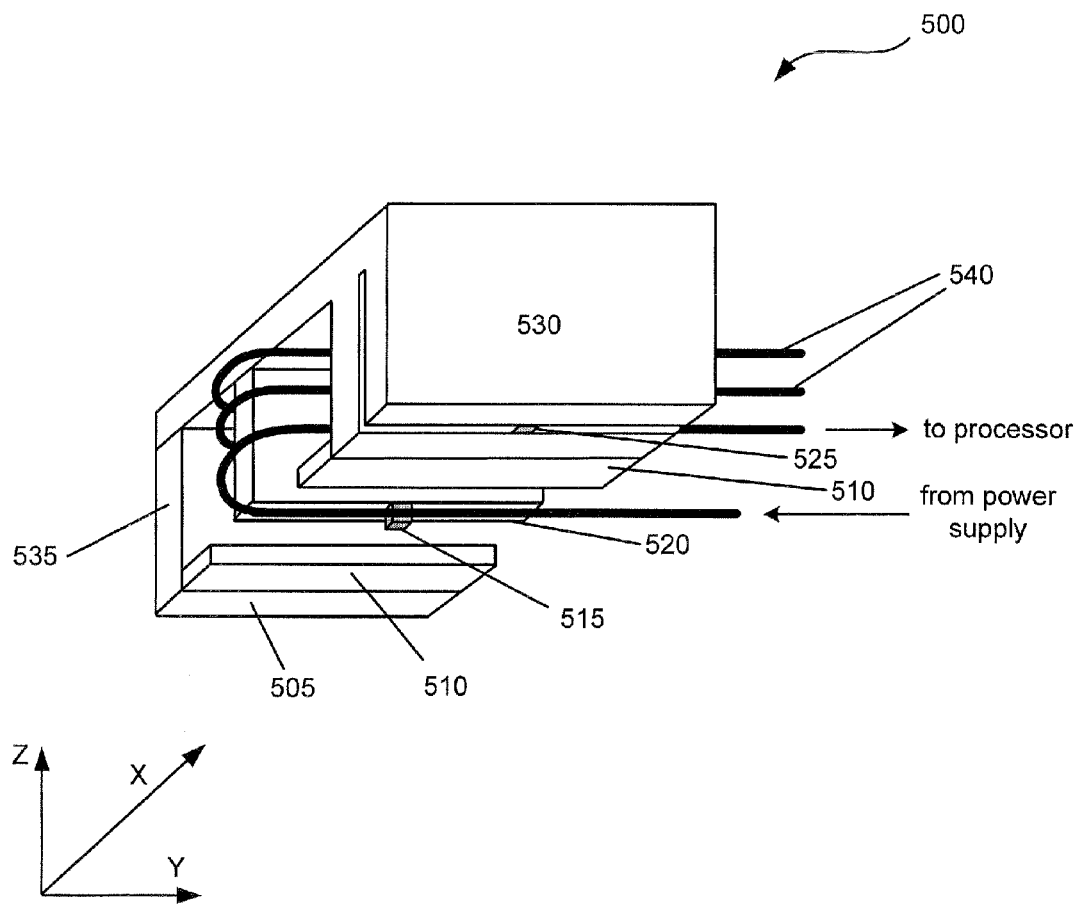
FIG. 5 illustrates a perspective view of an implementation of a transducer head with a read sensor, a waveform sensor, and a write pole, the waveform sensor located up-track of the write pole and down-track of the read sensor.

FIG. 5 illustrates a perspective view of an implementation of a transducer head 500 with a read sensor 525, an electrical wire 535 serving as a waveform sensor or a spin-polarized current conduit, and a write pole 515, the electrical wire 535 located up-track of the write pole 515 and down-track of the read sensor 525. The X, Y, Z labeled axes are illustrative only and not intended to limit the scope of the presently disclosed technology.

In operation, an electric current in coils 540 positioned around a yoke 520 creates a magnetic field in the write pole 515 and a return pole 505 that is used to affect the magnetization of an associated medium along a track of BPM. The magnetic field created by coils 540 is shielded by shields 510 from directly affecting the magnetization of the associated medium.

In the implementation shown in FIG. 5, the electrical wire 535 carries current from a power supply along a first length of an actuator arm associated with the transducer head 500. The electrical wire 535 then passes in close proximity to the write pole 515 below shields 510, up-track of the write pole 515, and down-track of the read sensor 525. After passing in close proximity to the write pole 515, the electrical wire 535 returns along a second length of the actuator arm above shields 510 and adjacent the yoke 520 to a processor for analysis of one or more properties of the current carried by the electrical wire 535. The processor may be located on the transducer head 500, on the actuator arm, or elsewhere in a structure containing the associated medium. In another implementation, the processor may act as a power supply.

Figures 6A, 6B:
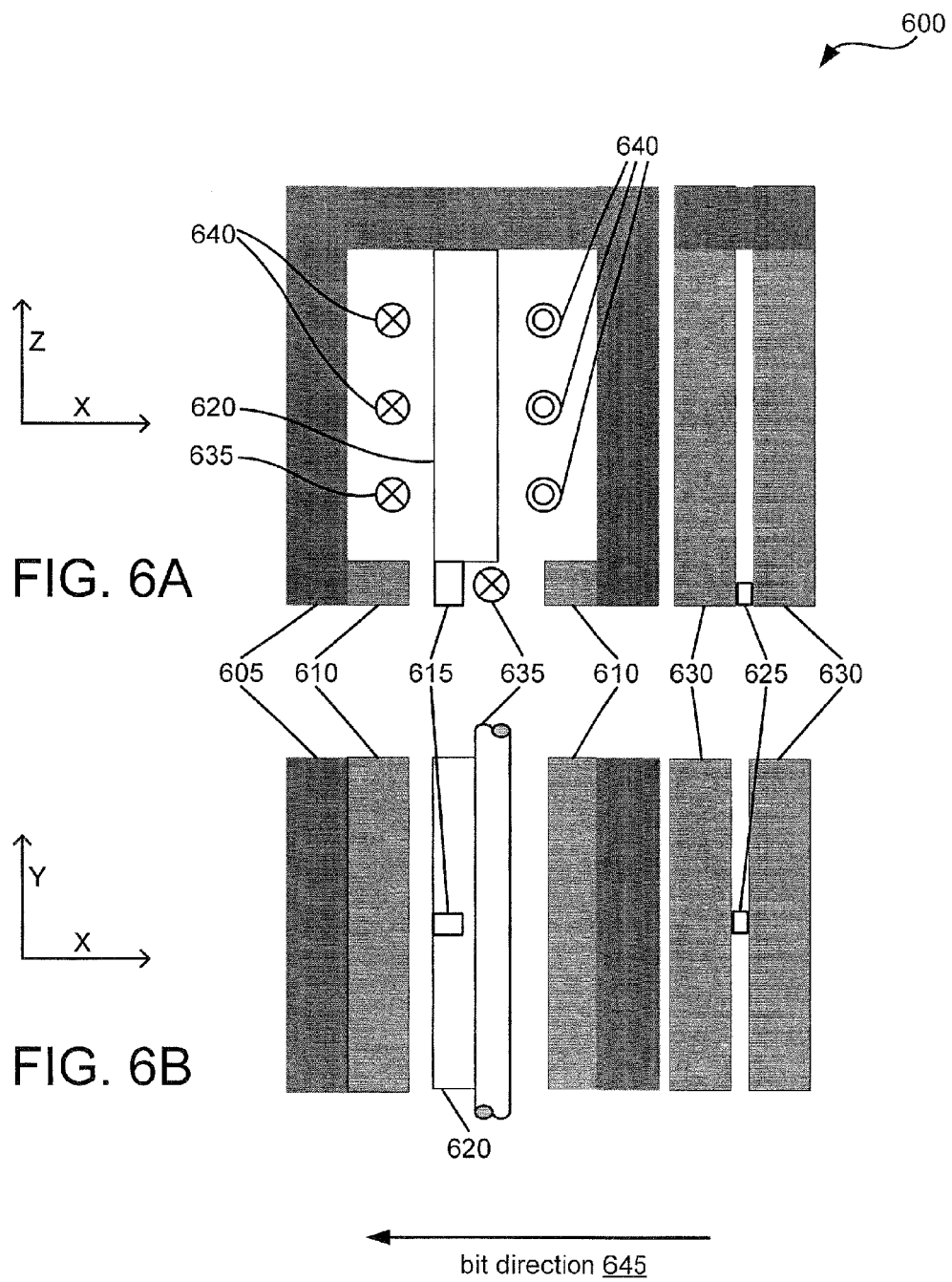
FIGS. 6A and 6B illustrate sectional elevation and plan views of an implementation of a transducer head with a waveform sensor, the waveform sensor located up-track of the write pole.

FIGS. 6A and 6B illustrate sectional elevation and plan views of an implementation of a transducer head 600 with an electrical wire 635 serving as a waveform sensor or a spin-polarized current conduit, the electrical wire 635 located up-track of the write pole 615. More specifically, FIG. 6A illustrates a side view of transducer head 600 and FIG. 6B illustrates a bottom view of transducer head 600. The X, Y, Z labeled axes are illustrative only and not intended to limit the scope of the presently disclosed technology. The X and O labeled coils 640 and electrical wire 635 indicate current flow in the y and negative y directions respectively.

In operation, an electric current in coils 640 positioned around a yoke 620 creates a magnetic field in a return pole 605 and the write pole 615 that may be used to affect the magnetization of an associated medium along a track of BPM. The magnetic field created by coils 640 is shielded by shields 610 from directly affecting the magnetization of the associated medium. Further, the individual patterned bits on the track of BPM move in bit direction 645 as the associated media rotates underneath the transducer head 600. Bit direction 645 as shown in the implementation of FIG. 6 is substantially in the negative x direction.

In the implementation shown in FIGS. 6A and 6B, the electrical wire 635 carries current from a power supply along a first length of an actuator arm associated with the transducer head 600. The electrical wire 635 then passes in close proximity to the write pole 615 below shields 610, up-track of the write pole 615, and down-track of the read sensor 625. After passing in close proximity to the write pole 615, the electrical wire 635 returns along a second length of the actuator arm above shields 610 and adjacent the yoke 620 to a processor for analysis of one or more properties of the current carried by the electrical wire 635. The processor may be located on the transducer head 600, on the actuator arm, or elsewhere in the structure containing the associated medium. In another implementation, the processor may act as a power supply.

FIGS. 7A and 7B illustrate sectional elevation and plan views of an implementation of a transducer head 700 with two electrical wires 735 serving as waveform sensor(s) and/or spin-polarized current conduit(s), each electrical wire 735 located up-track of the write pole 715. More specifically, FIG. 7A illustrates a side view of transducer head 700 and FIG. 7B illustrates a bottom view of transducer head 700. The X, Y, Z labeled axes are illustrative only and not intended to limit the scope of the presently disclosed technology. The X and O labeled coils 740 and electrical wires 735 indicate current flow in the y and negative y directions respectively.

In operation, an electric current in coils 740 positioned around a yoke 720 creates a magnetic field in a return pole 705 and the write pole 715 that may be used to affect the magnetization of an associated medium along a track of BPM. The magnetic field created by coils 740 is shielded by shields 710 from directly affecting the magnetization of the associated medium. Further, the individual patterned bits on the track of BPM move in bit direction 745 as the associated media rotates underneath the transducer head 700. Bit direction 745 as shown in the implementation of FIG. 7 is substantially in the negative x direction.

In the implementation shown in FIGS. 7A and 7B, the electrical wires 735 carry current from a power supply along a first length of an actuator arm associated with the transducer head 700. The electrical wires 735 then pass in close proximity to the write pole 715 below shields 710 and up-track of the read sensor 725. After passing in close proximity to the write pole 715, the electrical wires 735 return along a second length of the actuator arm above shields 710 and adjacent the yoke 720 to a processor for analysis of one or more properties of the current carried by the electrical wires 735. The processor may be located on the transducer head 700, on the actuator arm, or elsewhere in a structure containing the associated medium. In another implementation, the processor may act as a power supply.

Multiple electrical wires 735 may act as redundant systems for checking the accuracy of the waveform sensors. Additionally, multiple electrical wires 735 may be configured to supply a differential signal to the processor to increase accuracy by reducing noise. More specifically, each electrical wire 735 may contain a complementary signal and the processor may be configured to detect differences in the two signals. If the two complementary signals are transmitted on balanced lines, the processor can reduce noise by rejecting any common-mode interference between the two electrical wires 735. Differential signal processing is also scalable to more than two electrical wires 735.

In some implementations, such as the implementations shown in FIGS. 5, 6, and 7, the electrical wire(s) 535, 635, and 735 are positioned up-track of the write poles 515, 615, and 715. In other implementations, the electrical wire(s) are positioned down-track of a write pole. In yet other implementations, there are multiple electrical wires positioned up-track and/or down-track of a write pole.

Figure 8:
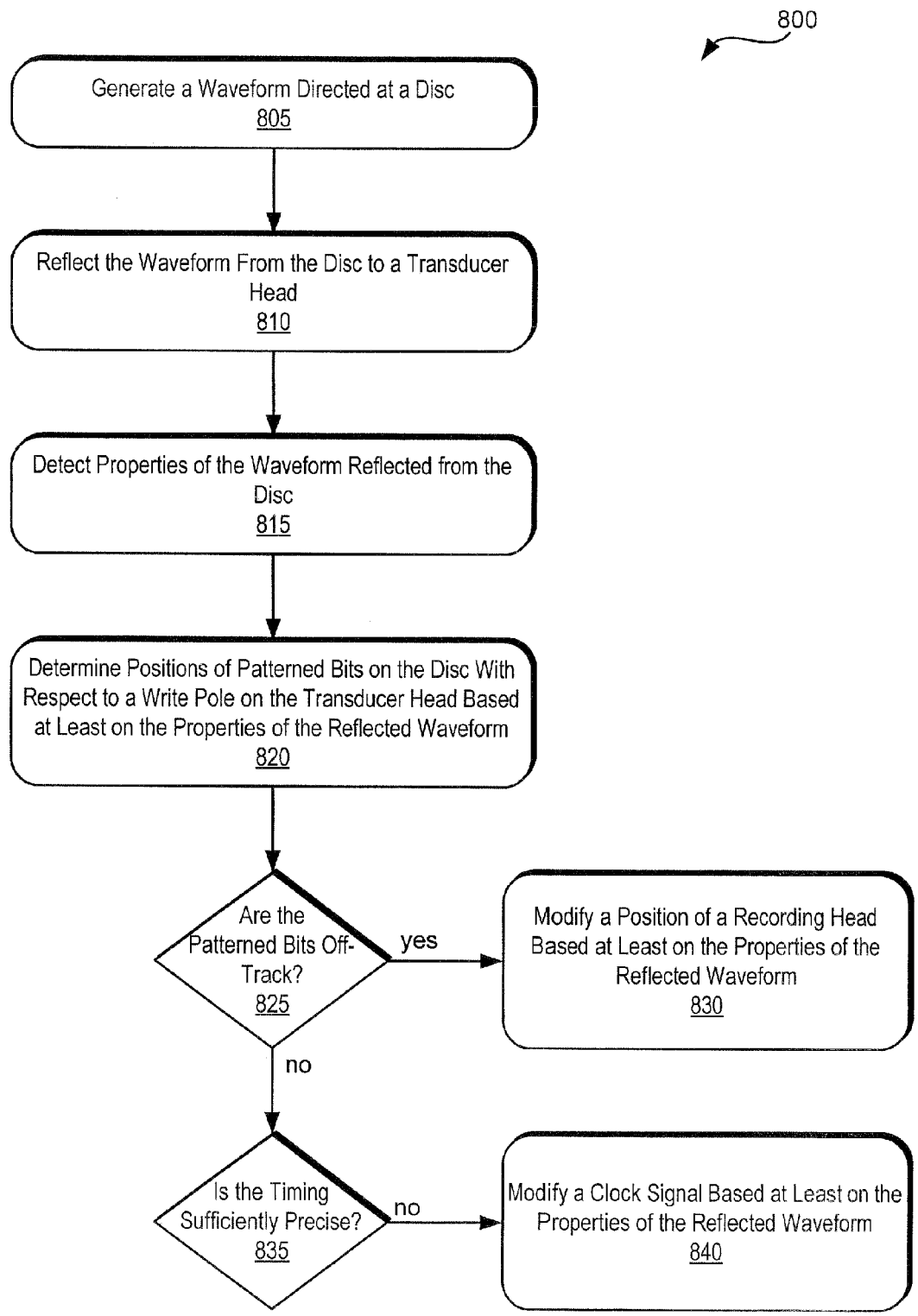
FIG. 8 is a flow chart illustrating operations for using a property of a reflected waveform to accurately write data bits to patterned bits on a disc and maintain a consistent data track during writing.

FIG. 8 is a flow chart illustrating operations 800 for using a property of a reflected waveform to accurately write data bits to patterned bits on a disc and maintain a consistent data track during writing. First, an oscillator positioned either on the transducer head or in its vicinity generates a waveform that interacts with a disc 805. The waveform is then reflected off of the BPM on the disc and intercepted by a transducer head 810 flying above the disc surface.

The transducer head contains one or more waveform sensors that are configured to detect one or more properties of the waveform reflected from the disc 815. The properties may be wave shape, wave level, amplitude, frequency, wavelength, and/or other properties specific to the waveform. In one implementation, the properties of the reflected waveform vary according to whether the waveform sensor is positioned on-bit or off-bit. In another implementation, the property of the reflected waveform varies according to whether the waveform sensor is maintaining an accurate and/or consistent data track.

Next, a computer determines positions of patterned bits on the disc with respect to a write pole on the transducer head based at least on the one or more properties of the reflected waveform 820. The computer then determines if the positions of patterned bits on the disc are off-track with respect to the write pole 825. If the positions of patterned bits are off-track, the computer modifies a position of the transducer head based at least on the properties of the reflected waveform 830. This position modification may correct the data track so that the write pole consistently passes over targeted patterned bits on the disc.

Next, the computer determines if the magnetization of the write pole is precisely sequenced with the passage of patterned bits underneath the transducer head 835. If the magnetization timing is insufficiently precise, the computer modifies a clock signal based at least on the properties of the reflected waveform 840. The clock signal modification may correct a data writing operation that is not timed correctly with patterned bits passing underneath the transducer head.

Figure 9:
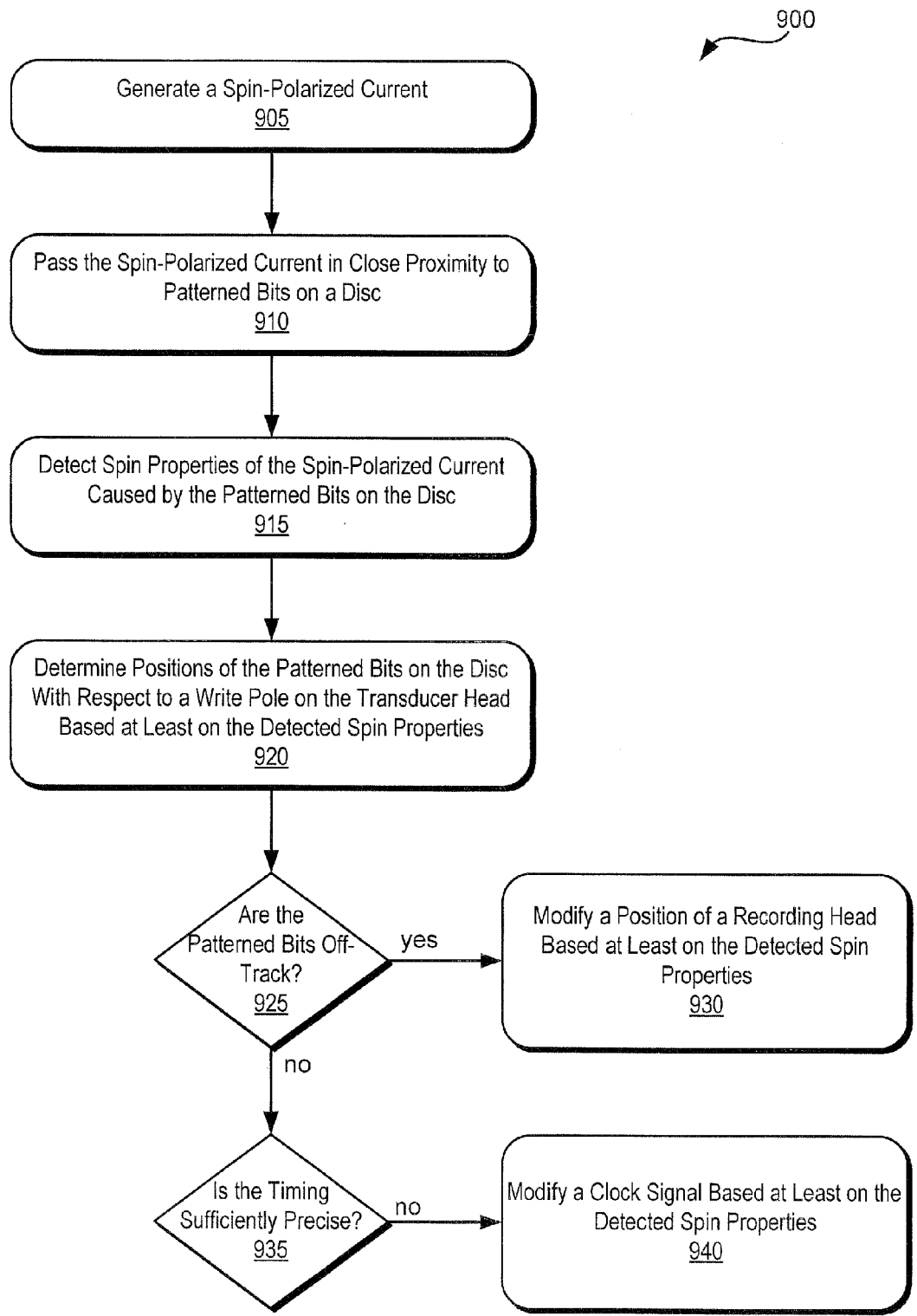
FIG. 9 is a flow chart illustrating operations for using a property of a spin-polarized current to accurately write data bits to patterned bits on a disc and maintain a consistent data track during writing.

FIG. 9 is a flow chart illustrating operations 900 for using a property of a spin-polarized current to accurately write data bits to patterned bits on a disc and maintain a consistent data track during writing. First, a spin angular momentum injector positioned either on the transducer head or in its vicinity generates a spin-polarized current 905. The spin-polarized current is then passed in close proximity to the patterned bits on the disc via an electrical wire 910. Spin properties of the spin-polarized current flow are affected by magnetic properties of the patterned bits on the disc.

A spin angular momentum sensor detects one or more spin properties of the spin-polarized current after passing in close proximity to the patterned bits on the disc 915. The spin properties may be spin magnitude, spin direction, spin period, and/or other properties specific to the spin-polarized current. In one implementation, the spin properties of the spin-polarized current vary according to whether the electrical wire is positioned on-bit or off-bit. In another implementation, the spin properties of the spin-polarized current variety according to whether the electrical wire maintains an accurate and/or consistent data track.

Next, a computer determines positions of patterned bits on the disc with respect to a write pole on the transducer head based at least on the detected spin properties 920. The computer then determines if the positions of patterned bits on the disc are off-track with respect to the electrical wire 925. If the positions of patterned bits are off-track, the computer modifies a position of the transducer head based at least on the detected spin properties 930. This position modification may correct the data track so that the write pole consistently passes over targeted patterned bits on the disc.

Next, the computer determines if the magnetization of the write pole is precisely sequenced with the passage of patterned bits underneath the transducer head 935. If the magnetization timing is insufficiently precise, the computer modifies a clock signal based at least on the detected spin properties 940. The clock signal modification may correct a data writing operation that is not timed correctly with patterned bits passing underneath the transducer head.

Figure 10:
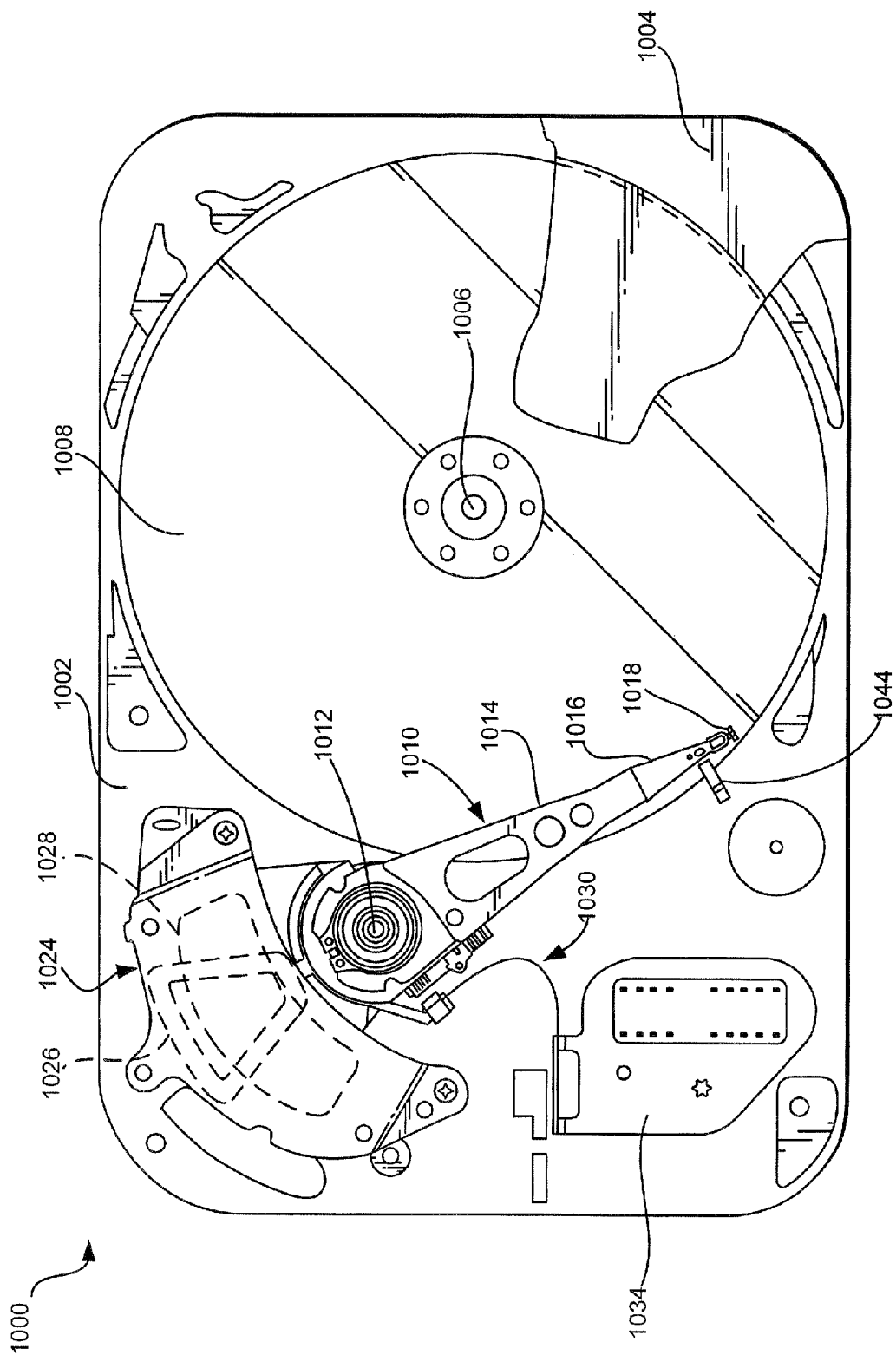
FIG. 10 illustrates a plan view of an example disc drive.

FIG. 10 illustrates a plan view of an example disc drive 1000. The disc drive 1000 includes a base 1002 to which various components of the disc drive 1000 are mounted. A top cover 1004, shown partially cut away, cooperates with the base 1002 to form an internal, sealed environment for the disc drive in a conventional manner. The components include a spindle motor 1006 that rotates one or more storage medium discs 1008 at a constant high speed. Information is written to and read from tracks on the discs 1008 through the use of an actuator assembly 1010, which rotates during a seek operation about a bearing shaft assembly 1012 positioned adjacent the discs 1008. The actuator assembly 1010 includes a plurality of actuator arms 1014 that extend towards the discs 1008, with one or more flexures 1016 extending from each of the actuator arms 1014. Mounted at the distal end of each of the flexures 1016 is a head 1018 that includes an air bearing slider enabling the head 1018 to fly in close proximity above the corresponding surface of the associated disc 1008. The distance between the head 1018 and the storage media surface during flight is referred to as the fly height During a seek operation, the track position of the head 1018 is controlled through the use of a voice coil motor (VCM) 1024, which typically includes a coil 1026 attached to the actuator assembly 1010, as well as one or more permanent magnets 1028 which establish a magnetic field in which the coil 1026 is immersed. The controlled application of current to the coil 1026 causes magnetic interaction between the permanent magnets 1028 and the coil 1026 so that the coil 1026 moves in accordance with the well-known Lorentz relationship. As the coil 1026 moves, the actuator assembly 1010 pivots about the bearing shaft assembly 1012 and the transducer heads 1018 are caused to move across the surfaces of the discs 1008.

The spindle motor 1006 is typically de-energized when the disc drive 1000 is not in use for extended periods of time. The transducer heads 1018 are moved away from portions of the disk 1008 containing data when the drive motor is de-energized. The transducer heads 1018 are secured over portions of the disk not containing data through the use of an actuator latch arrangement and/or ramp assembly 1044, which prevents inadvertent rotation of the actuator assembly 1010 when the drive discs 1008 are not spinning.

A flex assembly 1030 provides the requisite electrical connection paths for the actuator assembly 1010 while allowing pivotal movement of the actuator assembly 1010 during operation. The flex assembly 1030 includes a printed circuit board 1034 to which a flex cable connected with the actuator assembly 1010 and leading to the head 1018 is connected. The flex cable may be routed along the actuator arms 1014 and the flexures 1016 to the transducer heads 1018. The printed circuit board 1034 typically includes circuitry for controlling the write currents applied to the transducer heads 1018 during a write operation and a preamplifier for amplifying read signals generated by the transducer heads 1018 during a read operation. The flex assembly 1030 terminates at a flex bracket for communication through the base deck 1002 to a disc drive printed circuit board (not shown) mounted to the bottom side of the disc drive 1000.

In one implementation, a signal generator (e.g. an oscillator and/or a spin angular momentum injector) configured to generate a signal (e.g. a waveform or a spin-polarized current) that interacts with the disc 1008 is contained within the example disk drive 1000 between the base 1002 and the top cover 1004. In another implementation, the transducer head 1018 includes one or more electrical wires serving as waveform sensor(s) and/or spin-polarized current conduit(s) placed up-track of a write pole. In another implementation, the transducer head 1018 includes one or more electrical wires serving as waveform sensor(s) and/or spin-polarized current conduit(s) placed down-track of the write pole.

The above specification and examples provide a complete description of the structures of exemplary implementations of apparatus that may be used for waveform based bit detection for bit patterned media. Although various implementations of the apparatus have been described above with a certain degree of particularity, or with reference to one or more individual implementations, those skilled in the art could make numerous alterations to the disclosed implementations without departing from the spirit or scope of the presently disclosed technology. It is intended that all matter contained in the above description and shown in the accompanying drawings shall be interpreted as illustrative only of particular implementations and not limiting. The implementations described above and other implementations are within the scope of the following claims.

What is claimed:

1. A system for detecting a bit in a bit-patterned media, the system comprising:
    a transducer head including a read sensor attached to the transducer head, a write pole attached to the transducer head, and one or more waveform sensors attached to the transducer head, wherein the one or more waveform sensors are configured to detect a property of a waveform reflected from the bit to the transducer head.

2. The system of claim 1, further comprising:
    an oscillator configured to generate the waveform; and
    a processor configured to relate the property of the waveform with a position of the bit with respect to the transducer head.

3. The system of claim 1, wherein the one or more waveform sensors are positioned up-track from the write pole and down-track from the read sensor.

4. The system of claim 1, wherein at least one waveform sensor of the one or more waveform sensors is positioned up-track from the write pole and at least one waveform sensor of the one or more waveform sensors is positioned down-track from the write pole.

5. A method comprising:
    generating a first waveform to interact with a bit in a bit patterned media;
    detecting a property of a second waveform, the second waveform being a reflection of the first waveform from the bit; and
    determining a position of the bit based at least on the property of the second waveform.

6. The method of claim 5, wherein the property of the second waveform is frequency.

7. The method of claim 5, wherein the property of the second waveform is amplitude.

8. The method of claim 5, wherein the property of the second waveform is phase with respect to a clock signal.

9. The method of claim 5, further comprising:
    modifying a position of a transducer head based at least on the property of the second waveform.

10. The method of claim 5, further comprising:
    modifying a clock signal based at least on the property of the second waveform.

11. The method of claim 5, wherein a frequency of the second waveform represents average timing of bits passing in close proximity to a transducer head.

12. The method of claim 5, wherein the first waveform is a microwave.

13. A method comprising:
    generating a first spin-polarized current to interact with a bit in a bit-patterned media;
    detecting a property of a second spin-polarized current, the second spin-polarized current being the first spin-polarized current after an interaction with the bit; and
    determining a position of the bit based at least on the property of the second spin-polarized current.

14. The method of claim 13, wherein the property of the second spin-polarized current is spin direction.

15. The method of claim 13, wherein the property of the second spin-polarized current is spin magnitude.

16. The method of claim 13, wherein the property of the second spin-polarized current is phase with respect to a clock signal.

17. The method of claim 13, further comprising:
    modifying a position of a transducer head based at least on the property of the second spin-polarized current.

18. The method of claim 13, further comprising:
    modifying a clock signal based at least on the property of the second spin-polarized current.

19. The method of claim 13, wherein a frequency of the second spin-polarized current represents average timing of bits passing in close proximity to a transducer head.

20. A system for detecting a bit in a bit-patterned media, the system comprising:
    a transducer head including a read sensor attached to the transducer head, a write pole attached to the transducer head, and one or more spin angular momentum sensors attached to the transducer head, wherein the one or more spin angular momentum sensors are configured to detect a property of a spin-polarized current after interaction with the bit.

21. The system of claim 20, further comprising:
    a spin angular momentum injector configured to generate the spin-polarized current; and
    a processor configured to relate the property of the spin-polarized current with a position of the bit with respect to the transducer head.

22. The system of claim 20, wherein the one or more spin angular momentum sensors are positioned up-track from the write pole and down-track from the read sensor.

23. The system of claim 20, wherein at least one spin angular momentum sensor of the one or more spin angular momentum sensors is positioned up-track from the write pole and at least one spin angular momentum sensor of the one or more spin angular momentum sensors is positioned down-track from the write pole.

* * * * *